United States Patent [19]

Nixon et al.

[11] 3,767,384

[45] Oct. 23, 1973

[54] RECOVERY OF TIN FROM ORE CONCENTRATES AND OTHER TIN-BEARING MATERIALS

[75] Inventors: Philip John Nixon, Stoke-on-Trent, England; Alan Philip Prosser, Kareela N. S. W., Australia

[73] Assignee: Consolidated Gold Fields Limited, London, England

[22] Filed: Sept. 15, 1971

[21] Appl. No.: 180,797

[30] Foreign Application Priority Data
Oct. 2, 1970   Great Britain ................ 47,006/70

[52] U.S. Cl. .................. 75/101 R, 75/111, 75/115, 75/121, 423/98, 65/31

[51] Int. Cl. .................. C22b 3/00, C22b 25/04

[58] Field of Search ................ 75/115, 121, 101 R, 75/85; 423/98; 65/31

[56] References Cited
UNITED STATES PATENTS

| | | | |
|---|---|---|---|
| 1,902,735 | 3/1933 | Tamaru et al. ................ | 423/98 |
| 2,200,563 | 5/1940 | Simpson ................ | 423/98 |
| 1,461,957 | 7/1923 | Alexander ................ | 75/85 |

*Primary Examiner*—Edward J. Meros
*Assistant Examiner*—J. Cooper
*Attorney*—Larson, Taylor et al.

[57] ABSTRACT

Tin bearing materials are converted to a glass and the glass is acid-leached to obtain the tin in solution in chemically combined form.

5 Claims, 5 Drawing Figures

RECOVERY OF TIN FROM ORE CONCENTRATES AND OTHER TIN-BEARING MATERIALS

DESCRIPTION

This invention relates to the recovery of tin from ore concentrates and other tin bearing materials and is particularly concerned with recovery of tin from low-grade ore concentrates.

We have found that tin can be recovered from such materials, e.g. low-grade cassiterite concentrates, by a method which includes forming from the materials a glass, slag, or other vitreous material, which we refer to collectively as a glass, and then acid leaching the glass, in a powdered condition, to obtain the tin in solution in a chemically combined form, from which it may readily be recovered.

We have also found that the proportion of tin dissolved from the glass during the leaching step is determined by the proportion of the tin present in the glass in the stannous form.

Accordingly, the method of this invention comprises the step of forming the glass, which is to be leached, under such conditions that a large proportion of the tin in the glass is present in that form.

We have further found that leaching should desirably be effected in two stages, the first using an acid or acid mixture, e.g. hot concentrated sulphuric acid or hydrochloric acid, to convert the tin from the primarily oxide form in the glass to a soluble salt, and the second washing out the salt, e.g. with water.

It is preferred, if possible, in leaching the glass to so carry out the step that while the metal ions are brought into solution, the residual glass matrix is not broken down. This avoids dissolution of silica, ordinarily a major constituent of the glass, in a colloidal form that hinders filtering. We have found that this result can be obtained by utilising moderately concentrated sulphuric acid, for example $9M \cdot H_2SO_4$.

The tin may be recovered from the leaching solution in any of a number of ways, e.g. by precipitation by direct gaseous reduction or by hydrolysis or by formation of tin hydroxide or production of another low solubility compound, or by electrowinning, or by displacement of the tin by another metal, or by solvent extraction.

We have further found that, if good recovery of tin is to be achieved, the proportion of silica in the glass must be carefully selected not to be so low that a glass will not form and nevertheless not so high that tin recovery is inhibited. The concentrates or other materials being treated will normally naturally contain a substantial proportion of silica and may without additions be capable of forming a glass, but it may be necessary or desirable to add silica or other glass-forming substances to secure good tin recovery.

Although a glass formed from the foregoing constituents will contain a substantial proportion of the tin in stannous form if the glass is produced in air, an increased proportion of tin in stannous form is obtained if there is used a reducing atmosphere, suitably hydrogen, or methane, or carbon monoxide given by a layer of coke or anthracite on the melt.

It is found that the temperature and time of leaching are not critical, nor is the particle size of the powdered glass. Fusion temperatures in forming the glass are desirably 1,250° C upwards.

The method and effect of varying operating parameters are illustrated by the following experimental results.

In the first experiments, glasses were prepared by heating various mixtures of a low-grade cassiterite concentrate, with or without additions of silica and/or lime (calcium oxide). The concentrate from which the glasses were prepared had the following analysis in weight % expressed as oxides:

|  |  |  |
|---|---|---|
|  | $SiO_2$ | 32.5 |
|  | $Fe_2O_3$ | 22.75 |
|  | $SnO_2$ | 15.8 |
|  | $Al_2O_3$ | 8.5 |
|  | $MgO$ | 5.12 |
|  | $K_2O$ | 1.28 |
|  | $CuO$ | 1.0 |
|  | $CaO$ | 0.62 |
|  | $TiO_2$ | 0.07 |
| and | $S$ | 4.0 |

The resulting glasses, in which a substantial proportion of the tin was present as stannous oxide, were leached by treatment for 19 hours at 150° C with $9M \cdot H_2SO_4$.

The following are tables of typical results obtained.

TABLE 1

| Glass formation Temp. °C | Heating time | Proportion of tin in stannous form | Proportion of total recovered |
|---|---|---|---|
| 1250° | 30 mins | 100% | 100% |
| 1150° | 30 mins | 80% | 80% |
| 1050° | 30 mins | 60% | 65% |
| 1050° | 1¼ hours | 60% | 60% |
| 1050° | 4 hours | 65% | 65% |

Added CaO: 10% on the weight of the concentrate

These results show that the time of heating at a particular temperature has little effect on the proportion of tin present in stannous form, that the higher the glass formation temperature (up to 1,250° C) the higher the proportion of tin in stannous form, and that in each case, within the limits of analytical accuracy (plus or minus 5 to 10%), the whole of the stannous tin is recovered in solution.

The results of other experiments confirming the importance of the tin being in the stannous form are shown in Table 2; in these experiments leaching was carried out by treatment with $9M \cdot H_2SO_4$ at 150° C for 1 hour and the fusion mixture contained added lime to give 31.2% $SiO_2$.

TABLE 2

| Fusion temperature °C | Proportion of total tin in solution | Appearance of fused product |
|---|---|---|
| 1450° | 100% | glass |
| 1350° | 100% | glass |
| 1250° | 100% | glass |
| 1150° | 70% | devitrified glass * |
| 1050° | 20% | sinter * |

The presence of stannic oxide in the cooled, fused products marked with an asterisk was confirmed by X-ray powder diffraction and by electron microprobe analysis.

Iron and aluminium were also present in solution in the leaching liquid.

In order to test the effect of the silica content of a glass on its leachability with $9M \cdot H_2SO_4$ at 150° C in air, glasses made from the concentrate with various proportions of added lime or silica as appropriate were ground to −100 +200 mesh B.S.S. (British Standard Sieve) and leached as before for 3 hours. Typical results are shown in Curve A of FIG. 1 of the accompanying drawings, which shows the percentage "P" of the total tin recovered in the leaching liquid plotted as the ordinates and the silica contents plotted as abscissae.

With a silica content below about 22% a glass is not formed and with silica contents above about 35% a rapid reduction in tin recovery is evident.

Curves B and C of FIG. 1 illustrate the effect on P of different leaching temperatures on tin and iron recovery from a glass with added lime and containing 31.2% silica, ground to −100 +200 mesh B.S.S. and using 9M·$H_2SO_4$ for half an hour.

FIG. 2 is a graph showing the effect on P of varying the concentration of the leaching agent under leaching for ½ hour at 65° C with subsequent washing, of a glass ground to −200 B.S.S. It is to be noted however that with concentrations below about 9M·$H_2SO_4$ the glass particles disintegrate forming colloidal silica hindering filtering, e.g. changing the filtering time from 10 minutes to several hours.

It is believed that the hydrogen ion concentration is important in this respect since the addition of sodium sulphate or iron sulphate to a 4·5M·$H_2SO_4$ leaching agent, so increasing the $SO_4$ ion concentration, does not prevent disintegration of the glass particles.

Figure 1:
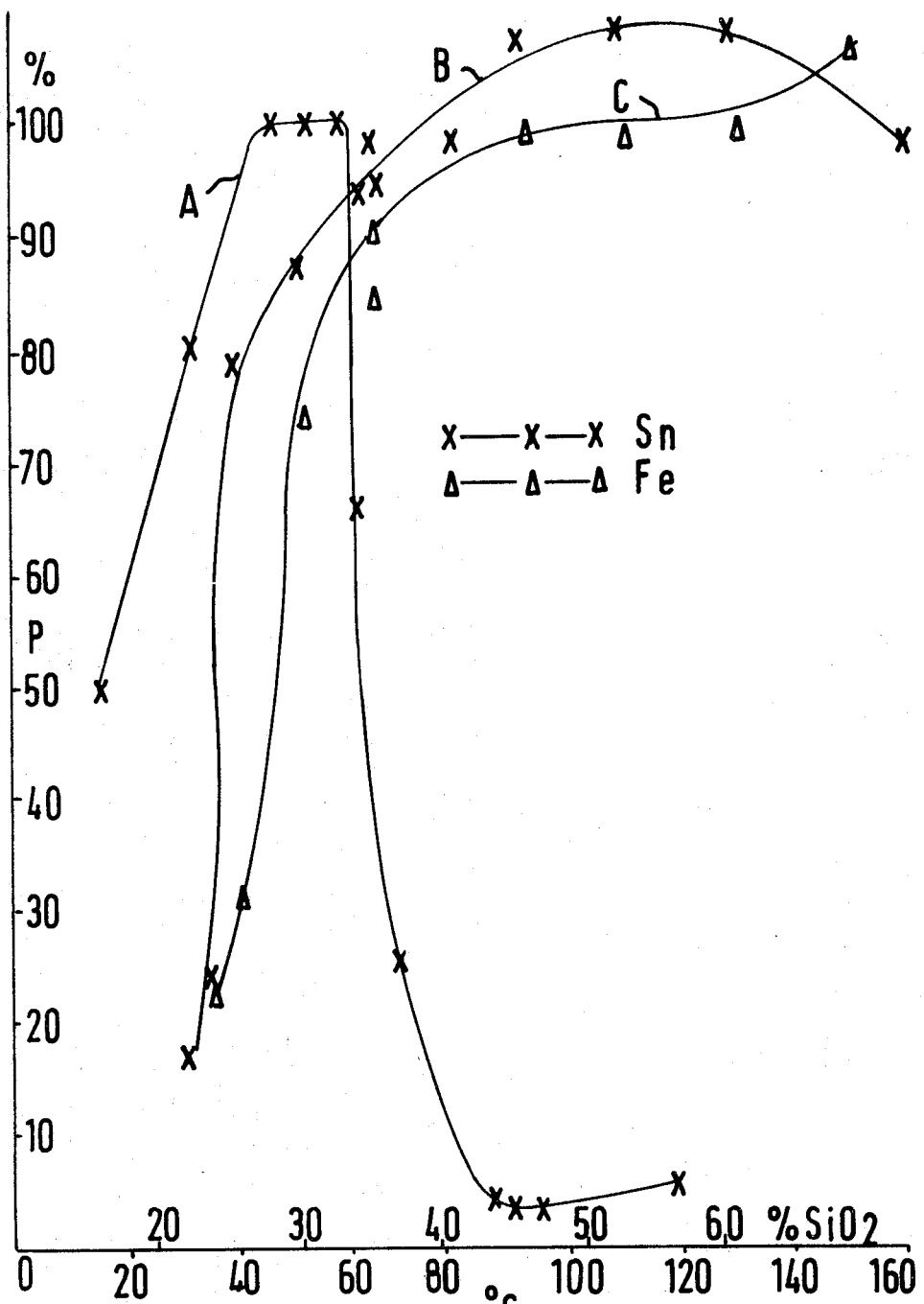
Figure 2:
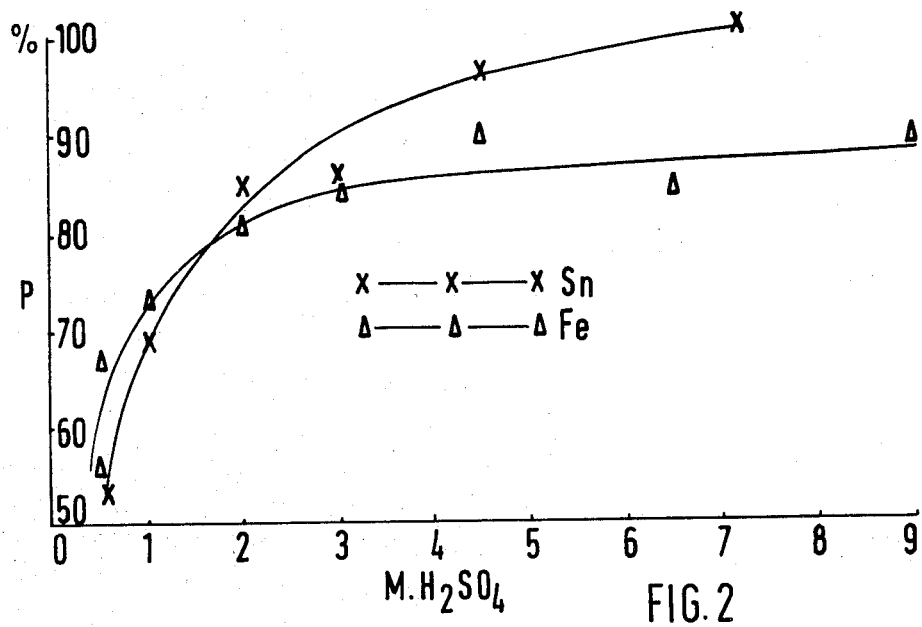
Figure 3:
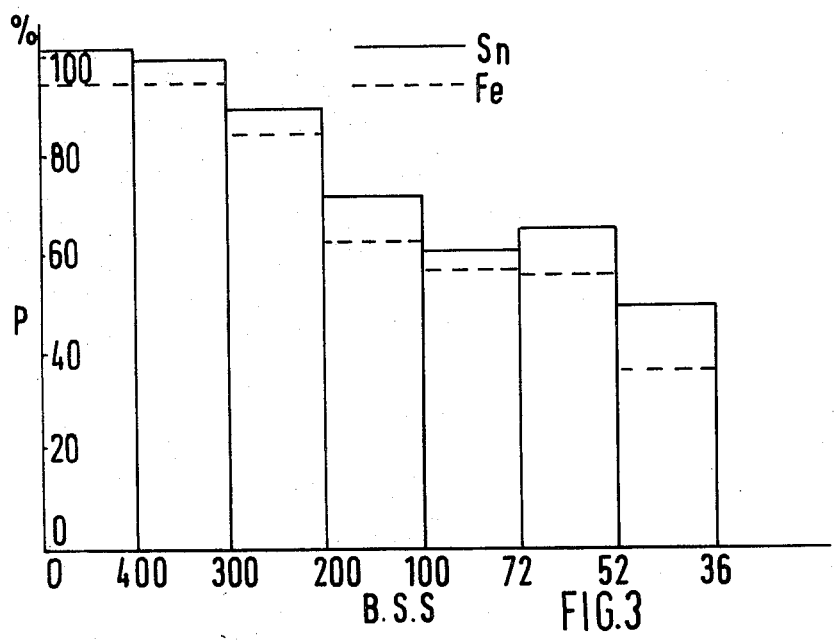
FIG. 3 illustrates the effect on P of varying the size of glass particle on tin and iron recovery, the abscissae being particle size indicated by B.S.S. mesh numbers. Leaching was at 51° C for half an hour with 9M·$H_2SO_4$ with subsequent washing.
Figure 4:
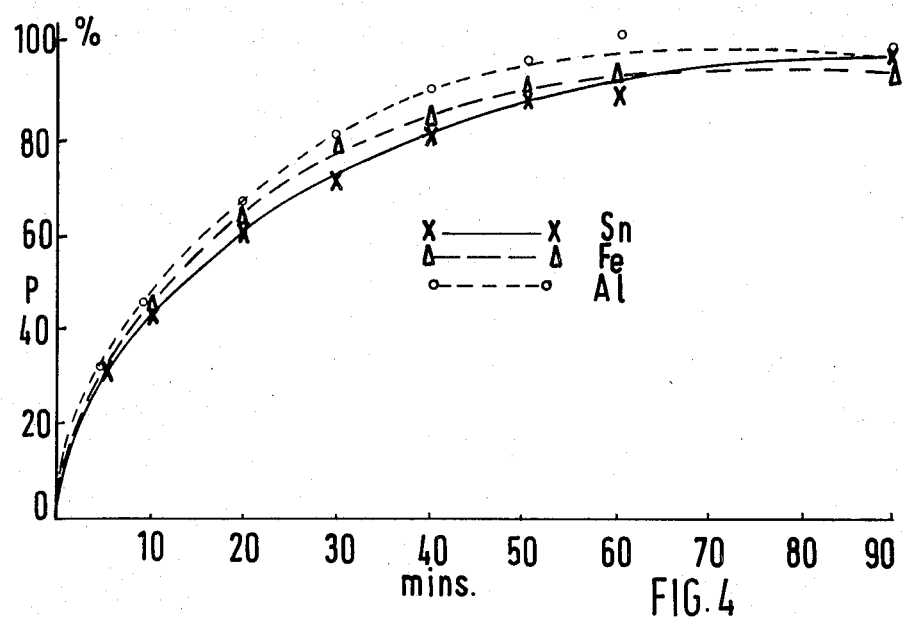
FIGS. 4 and 5 are graphs illustrating the effect on P of leaching time on tin recovery at various temperatures. The glass particles were ground to −100 +200 mesh B.S.S. and the leaching agent was 9M·$H_2SO_4$.
Figure 5:
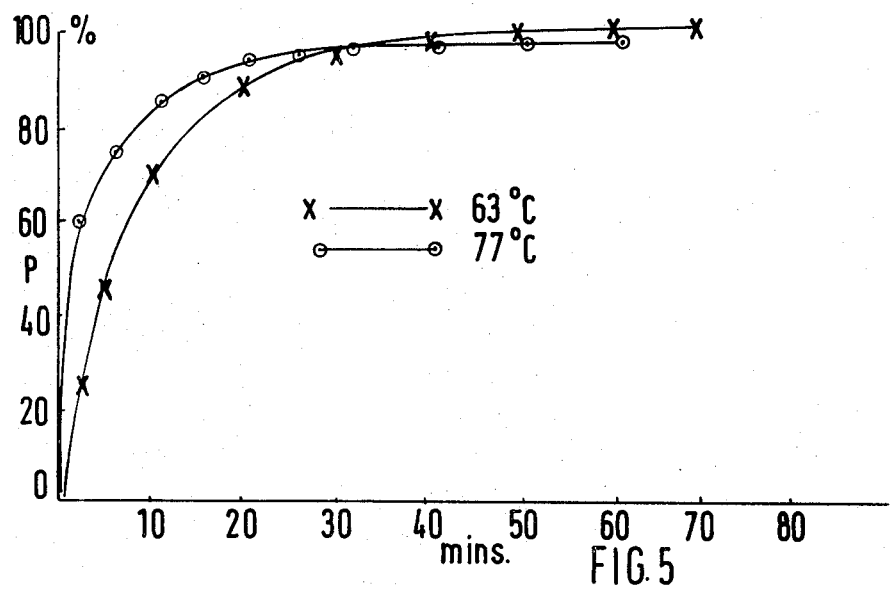

It will be seen that particle size, time and temperature are not critical.

Corresponding tests with glasses in which sodium hydroxide replaced the lime gave like results.

For commerical purposes it is thought that 9M·$H_2SO_4$ should be used as the leaching agent and that a leaching temperature of 60° to 70° C is satisfactory with the glass particles ground to −52 mesh B.S.S.

We claim:

1. A process for the recovery of tin comprising: leaching finely divided particles of glass formed by fusing a stannic tin-bearing material containing about 22 to 35% silica by weight at a temperature of at least 1,250° C in a reducing atmosphere to form the glass and to bring the tin into stannous form with sulfuric acid of about 9M concentration at a temperature of at least about 60° C to bring the stannous tin into the form of a soluble salt while avoiding the formation of colloidal silica; and washing the acid leached glass to dissolve the soluble stannous salt therefrom.

2. A process according to claim 1 wherein said reducing atmosphere is selected from the group consisting of hydrogen, methane, and carbon dioxide.

3. A process according to claim 1 wherein said stannic tin-bearing material is a low grade ore concentrate.

4. A process according to claim 1 wherein said stannic tin-bearing material is a low grade cassiterite concentrate.

5. A process according to claim 1 wherein tin is recovered from the dissolved stannous salt.

* * * * *